United States Patent Office 2,887,654
Patented May 19, 1959

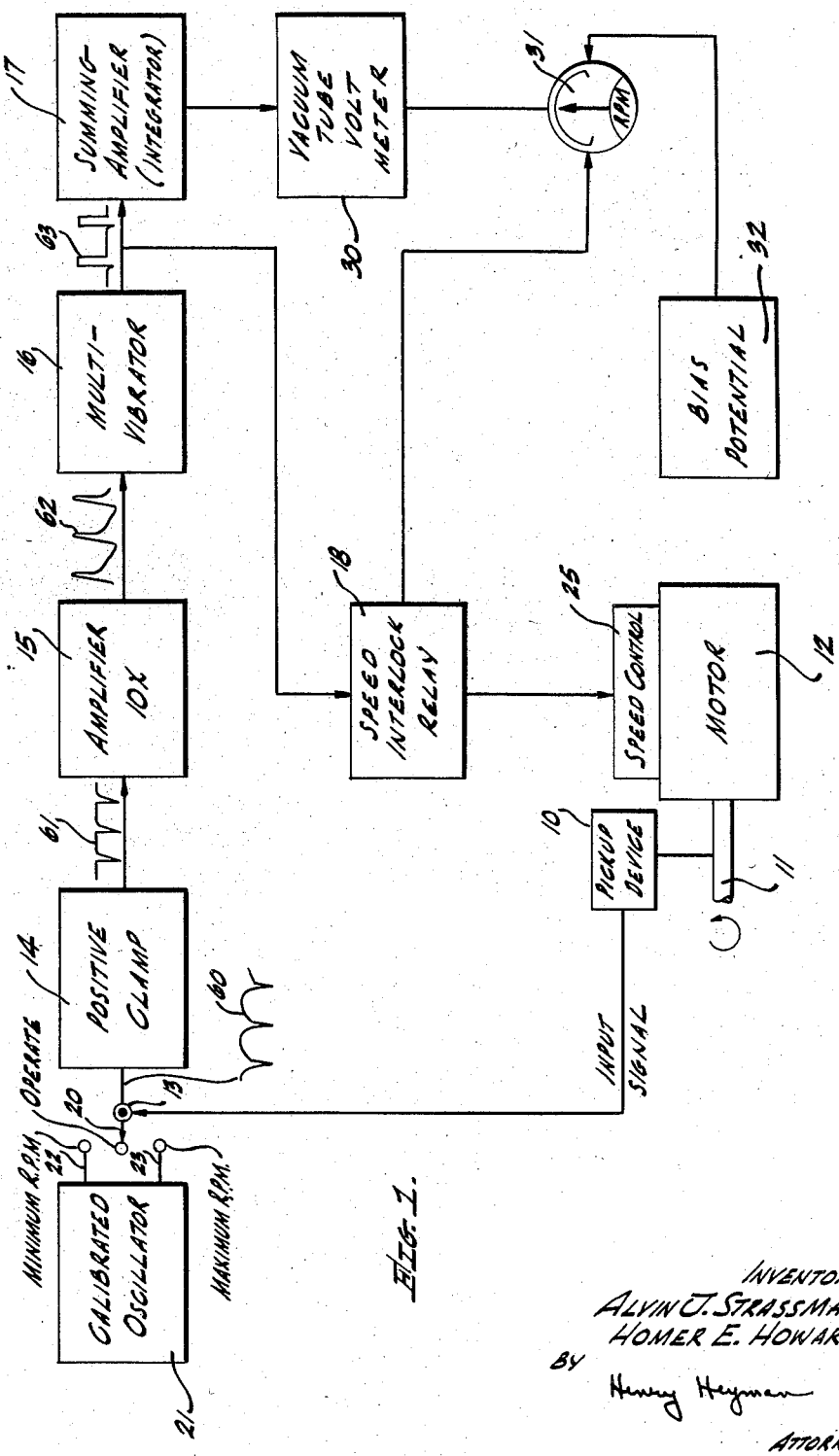

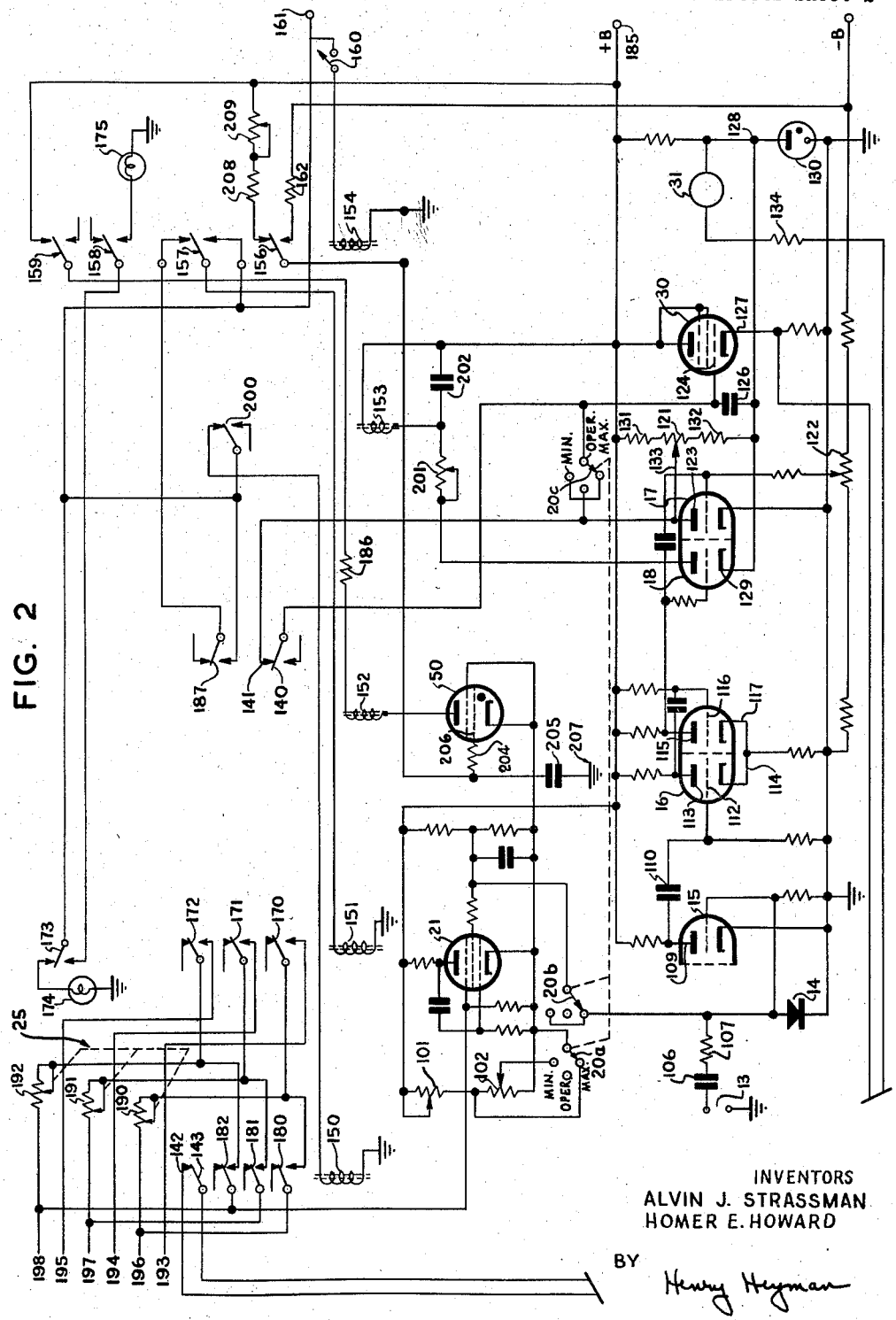

2,887,654

ELECTRONIC TACHOMETER WITH SELECTED EXPANDED SCALE

Alvin J. Strassman, Van Nuys, and Homer E. Howard, Tarzana, Calif., assignors to Hughes Aircraft Company, Culver City, Calif., a corporation of Delaware Application April 19, 1955, Serial No. 502,345

6 Claims. (Cl. 324—70)

This invention relates to electronic tachometers and particularly to an electronic tachometer with provision for indicating predetermined ranges of rotational speed.

The electronic indication of rotational speed of motors, gyros and other similar machines is desirable because such indication may generally be accomplished without imparting a load upon the motors or gyros. In the past indicating instruments for the rotational speed of motors and the like have provided a full scale indication from no revolutions per unit of time to some prescribed maximum. If, for example, a rotational speed of 9250 r.p.m. was to be read it was not accomplished with much accuracy on a scale reading from 0 to 10,500 r.p.m. because of the crowding of such a scale in a practical form. But if the instrument can be made to read only from 9,000 to 10,500 r.p.m. then the speed adjustment of the exemplary 9,250 r.p.m. is possible with a high degree of accuracy.

In the present invention there has been devised a circuit and method for adjusting the speed of a rotating device such as a motor or the like to any exact speed within any predetermined range to a high degree of accuracy.

This is accomplished by holding a meter or other indicator out of the system of this invention by electronic circuitry until a predetermined rotational speed has been achieved and then inserting the meter into the electronic speed measuring circuit. A feature of the invention is a means of counteracting the value of speed indicating energy representing all rotational speeds less than a predetermined value and using this counteracting energy as a reference. When an equality is achieved between the reference and the speed indicating energy an indicating device is inserted in the circuit by the co-action of electronic devices and relays. The desired speed above the reference value is read upon the indicator.

An additional feature of the invention is a means for measuring the rotation speed decay of the motor device over a particular interval to determine friction and other such factors which affect the operation of the motor or other rotational device.

Accordingly, it is an object of this invention to provide an electronic tachometer incorporating an indicating means for showing a selected portion of the range of the tachometer.

It is also an object of this invention to provide an electronic tachometer wherein the indicating device is held out of operation except when a selected rotational speed has been achieved by the rotating device, the speed of which is being measured.

It is a further object of this invention to provide an electronic tachometer wherein the output of a rotating machine is detected by a magnetic pickup which produces a signal proportional to speed and which signal is utilized to operate an indicating system when a predetermined speed is achieved, the indicating system being rendered inoperative by other circuits referenced to said signal until this speed is reached.

It is yet another object of this invention to provide an electronic tachometer adapted to indicate the speed of rotating machinery between predetermined maximum and minimum limits.

And it is still another object of this invention to provide an electronic tachometer for rotating machinery wherein an indicating device is held inoperative until a predetermined rotational speed is reached by the operation of a control circuit in response to a voltage derived from the predetermined speed in relation to a reference voltage.

These and other objects of this invention along with the novel features of its organization and operation and their advantages are set forth in the following specification considered in connection with the accompanying drawings which illustrate a preferred embodiment of the invention by way of example. It is expressly understood, however, that the drawings are for illustrative purposes only and are not intended as defining the limits of the invention. The scope of the invention is pointed out in the appended claims.

In the drawings:

Fig. 1 is a block diagram of the selected expanded scale electronic tachometer of the invention; and Fig. 2 is a circuit diagram of the selected expanded scale electronic tachometer of this invention.

Referring now to Fig. 1 there is shown a block diagram of the selected expanded scale electronic tachometer of this invention. A pickup device 10 is provided which may be placed close to or in proximity of a rotating part 11 of a machine such as motor 12 the speed of which it is desired to measure. Pickup device 10 is connected to the input circuit 13 of the tachometer. The input circuit 13 is connected to an amplifier 15, through a clamp circuit 14. Amplifier 15 is connected to a one-shot multivibrator 16. Multivibrator 16 is connected to a summing amplifier, or integrator 17, and also to a speed interlock relay circuit 18.

Input circuit 13 is also connected to a switch 20 which has three positions. In Fig. 1 the switch is shown connected to the operate position. The remaining two positions of switch 20 are connected to a calibration oscillator 21 which has facilities to produce either of two output signals at 22 and 23. Speed interlock relay circuit 18 may be connected to a speed control 25 for motor 12. Alternatively, speed control 25 may be manually operated. Relay circuit 18 is also connected to meter 31.

Integrator 17 is connected to vacuum tube voltmeter 30. Vacuum tube voltmeter 30 is connected to indicator 31 which may be a meter or other indicating instrument. Meter 31 is also connected to a source of bias potential 32.

The overall operation of the selected expanded scale electronic tachometer of this invention may be understood with reference to the block diagram of Fig. 1.

Pickup device 10 is brought into close relation with a rotating portion 11 of a rotary machine such as motor 12. The pickup device 10 may be any device which will produce an electric pulse for each rotation of the rotating portion 11 of rotary machine 12 which may be a motor or other machine.

It may be necessary to equip the shaft or rotary portion 11 in some fashion to provide an energy of some type from which a pulse may be derived. One way in which this may be accomplished, if the pickup 10 is a magnetic coil device, is to magnetize a portion of rotating shaft 11 so that each time the magnetized portion passes the pickup coil 10 a pulse will be generated.

The pulse generated in pickup 10 is applied to amplifier 15 through clamp 14 by way of input circuit 13.

The resultant amplified pulse is applied to multivibrator 16 which generates a square-topped pulse for each revolution of rotary shaft 11. The pulses are applied to speed-interlock relay circuit 18. When the pulses are occurring at some predetermined frequency, speed-interlock relay circuit 18 is rendered operative to bring meter 31 into operation. Meter 31 indicates the speed at the above-mentioned predetermined value at the zero end of the meter scale which has been calibrated to indicate that predetermined value in r.p.m. at the zero point. At this frequency the bias potential 32 is exactly overcome to indicate zero on the meter. The vacuum tube voltmeter 30 provides the indicating potential for meter 31 which is developed by integrator 17, as a result of the pulses generated in multivibrator 16, in response to the pulses from pickup 10.

To calibrate the electronic tachometer so as to read a predetermined scale range of r.p.m. on meter 31, switch 20 is turned to position 22 for minimum range indication (zero of meter 31) or to position 23 for maximum range indication (full scale of meter 31). In either of positions 22 or 23 of switch 20 an output pulse sequence at a predetermined frequency is generated by calibration oscillator 21. For calibration of the range scale of meter 31 the output signal of calibration oscillator 21 as it appears at points 22 or 23 of switch 20 is applied to the electronic tachometer instead of the signal from pickup device 10. Adjustment means as further described below in connection with Fig. 2 are provided to set up the ranges of the electronic tachometer so as to indicate only the desired range of revolutions per minute or any other unit of time, on the full scale of the meter 31.

Referring now to Fig. 2 wherein there is shown the circuit diagram of the electronic tachometer of this invention, vacuum tube 21 is a calibrating oscillator, corresponding to block 21 of Fig. 1, which is arranged to provide two frequencies representing an upper and lower limit of the range to be covered by the electronic tachometer. Variable resistance control 101 may be adjusted to set the oscillation frequency to correspond to the desired upper limit. Variable resistance control 102 may be adjusted to set the oscillation frequency to correspond to the desired lower limit. A selector switch 20 having calibrate and operate positions is provided to select the value of variable resistance 101 and 102, respectively, and other circuit conditions, for adjustment of the scales in calibrating the electronic tachometer. The detailed operation of calibration oscillator 21 is not given because it is an R-C oscillator circuit of a type well-known to those skilled in the art. Switches 20a and 20b have three positions marked on the drawings of Fig. 1 and Fig. 2 Max, Min, and Operator. When set in the Operate position a signal is applied to amplifier 15 from input circuit 13 through capacitor 106 and limiting resistance 107. The signal is clamped by a diode 14 poled to be conductive for positive going and nonconductive for negative going signals. Diode 14 may be either a chemical or semi-conductor rectifier, or a vacuum tube device. The positive going signals are conducted to ground. The negative going signals are amplified by amplifier 15 which may be a conventional triode amplifier or any other. The signals applied to input circuit 13 are derived from pickup device 10 shown in Fig. 1 which may be attached to the rotating portion 11 of a rotating machine 12 as shown in Fig. 1 in some fashion so that pulses are generated in pickup device 10. There will be one pulse for each revolution of the rotating machine. The pickup device 10 may be magnetic, piezoelectric, or any other suitable electromechanical transducing medium for this purpose. The resulting pulse in the plate 109 of amplifier 15 is positive going, and is applied to the grid 112 of one-shot multivibrator 16 through a coupling capacitor 110. Multivibrator 16 is normally conducting in its right-hand half (as viewed in Fig. 2), involving plate 115, grid 116, and cathode 117. When the positive going signal is applied to grid 112 the section of the multivibrator 16 involving anode 113, grid 112, and cathode 114 becomes conductive while the other section of multivibrator 16 is cut off. The output voltage at anode 115 rises to the plate supply potential and remains at this level until the multivibrator 16 returns to its normal condition. The time during which the potential of anode 115 remains thus elevated may be determined by the formula $$T = CR_2 \frac{\ln 2E_{bb} - E_{b1} - E_{k2}}{E_{bb} - Ek_1 = E_{02}}$$

wherein $E_{bb}$=supply volts and $E_{b1}$ is plate volts, $E_{k1}$= cathode volts, and $E_0$=cut off volts.

The resultant output of multivibrator 16 is applied to a speed-interlock tube 18 which is biased at its cathode 129 through a gaseous regulator tube 130 to a reference level at point 128 such that interlock tube 18 is normally nonconducting until the speed (therefore the frequency of the pulses applied to tube 18) reaches a predetermined level. The output circuit of multivibrator 16 is also connected to an integrating circuit incorporating tube 17, relay contacts 140 and 141, anode adjustment 121 and the contacts 20c of Operate-Calibrate switch 20. A grid bias adjustment 122 for integrator 17 is also provided in order that, in the calibrate Max or Min positions of switch 20c, relay contacts 140 and 141 are by-passed, whereas, in the Operate position the signal from anode 123 of integrator tube 17 is applied to the grid 124 of the VTVM tube 30 through the relay contacts 140 and 141. The function of these relay contacts is more fully described below.

A charging capacitor 126 is connected between the cathode 129 of tube 18 and grid 124 of VTVM tube 30. Cathode 129 is also connected to the reference bias point 128 at gaseous regulator tube 130. Between the cathode 127 and reference bias point 128, meter 31 is inserted. This meter 31 is connected with a limiting resistance 134 and relay contacts 142 and 143 which will be further described below. The charge collected upon capacitor 126 determines the indication on meter 31.

Relays 150, 151, 152, 153, and 154, shown in Fig. 2, are provided to control the various operational requirements of the electronic tachometer of this invention. Relay 154 is the master power relay. Relay 154 has a set of 4 double throw contact assemblies 156, 157, 158, 159 which are shown in the diagram in their normally open position. Relay 154 is actuated when main power switch 160 is closed. Power switch 160 is connected to a source of potential 161. Upon actuation of relay 154, contacts 156 are closed to apply a negative (B—) potential to the grid of decay rate thyratron 50 through a grid leak resistance 162. The operation of decay rate thyratron 50 is further discussed below. Contacts 157 are closed to apply potential from source 161 to the coil of motor speed relay 151 to actuate relay 151. Relay 151 has contacts 170, 171, 172, and 173, respectively. When contacts 158 of relay 154 are closed, indicator lamp 175 is energized upon closing of contacts 173 of relay 151. Indicator lamp 175 when energized indicates that power is on. Time delay indicator lamp 174 is connected to contacts 173 in the open position of relay 151. The lamp 174 is energized in the open position of relay 151, when power is applied to the tachometer to indicate that a decay rate measurement is is progress. Contacts 159 of relay 154 are connected between a source 185 of B+ potential with respect to ground and the coil of relay 152 through a current limiting resistor 186. Relay 152 is connected in the anode circuit of thyratron 50. Relay 152 has contacts 140—141 and contacts 187. In the deenergized position of relay 152 contacts 187 are open and contacts 140—141 are closed. As has been previouslyy pointed out contacts 140—141 in the deenergized condition of relay 152 couple the output of integrator 17 to the input of VTVM tube 30. When relay 152 is energized contacts 140—141 are open, and contacts 187 are closed. In the closed condition of contacts 187 potential from source 161 is applied through contacts 157 (when relay 154 is de-energized) to relay 151. Thus relay 151 is only operative in the de-energized condition of relay 154.

Relay 153 is connected in the anode circuit of speed-interlock relay control circuit 18 in series with a current limiting adjustment control 201. A capacitor 202 is provided across the coil of relay 153 to prevent chatter which may otherwise occur due to the pulse nature of the signals applied to tube circuit 18 from multivibrator 16. Contacts 200 of relay 153 are shown in their normally closed condition which prevails when tube 18 (and therefore relay 153) is de-energized.

Relay 150 is connected through contacts 200 of relay 153 when relay 153 is de-energized to potential source 161. Thus relay 150 is operative only when relay 153 is de-energized.

Relay 150 has contacts 180, 181, 182 and 142—143. Contacts 180, 181, 182 are all shown in Fig. 2 as normally open in the de-energized condition of relay 150. Contacts 142—143 are normally closed in the de-energized condition of relay 150.

The motor 12 shown in Fig. 1 but not in Fig. 2 would receive its electric power from a 3-phase power source that would be applied to it through speed controls 190, 191, and 192 connected respectively in each leg of the 3-phase power source 196, 197, and 198. The speed controls are mechanically connected in tandem so as to be operated by a control arm common to all three controls 190, 191, and 192, to control the potential in all three phases 196, 197, 198 of the power line to the motor 12. The three controls 190, 191, and 192 tandem controlled comprise speed control 25 shown in Fig. 1. The power after control by the speed controls 190, 191 and 192 is applied to the motor through lines 193, 194 and 195, respectively.

In the energized condition of relay 150 contacts 142—143 are open thus opening the circuit to meter 31. Also, contacts 180, 181, and 182 are closed to shunt speed controls 190, 191 and 192 respectively.

In the energized condition of relay 151 contacts 170, 171, and 172 are closed to complete the 3-phase power circuit between 193—186, 194—197 and 195—198, respectively, to operate motor 12 shown in Fig. 1.

Thyratron decay rate circuit involving thyratron 50 includes a resistor 204 and capacitor 205 connected in series between the grid circuit 206 and ground at 207. The junction of resistor 204 and capacitor 205 is connected to the arm of contacts 156 of relay 154. The contact 156 connections have previously been described with the exception of resistors 208 and 209 connected between the terminal of 156 which is closed when relay 154 has de-energizes and B+ source 185. Resistors 208 and 209, comprise a current limiting network for charging capacitor 205 when relay 154 is de-energized. Resistor 209 is adjustable so that the charging time of capacitor 205 may be preset and will be approximately equal to R × C seconds where R is the sum in ohms of the fixed value of resistor 208 and adjusted value of resistor 209 and C is the value in farads of capacitor 205.

The following sequential description of the operation of the tachometer of this invention is made with reference to Fig. 2.

In the resting condition of the equipment it is stipulated that the electronic devices have been energized in so far as filament power is concerned and where B— power is directly supplied to these electronic components— that is not through relay contacts—this has also been done.

Relays 150, 151 and 152 are energized. Relays 153 and 154 are not energized. Indicator lamp 174 is not energized.

To place the equipment of this invention in operating condition for tachometer measurement, switch 160 is closed, and switch 20 is set to Operate position. Thereupon relay 154 is energized. Contacts 156 close to bring —B potential through resistor 162 to the grid of thyratron 50 to maintain thyratron 50 in a cut-off condition and also contacts 159 open to remove B+ potential applied to the plate of thyratron 50. The net result is the deactivation of thyratron 50 to de-energize relay 152, closing contacts 140—141 and opening contacts 187. Contacts 141—141 close the circuit between integrator 17 and VTVM 30. Contacts 187 open the circuit to relay 151 but contacts 157 of relay 154 transfer the energy from source 161 directly to relay 151 so that relay 151 remains energized. Now, therefore, relays 150, 151 and 154 are energized. Contacts 158 of relay 154 apply current to indicator lamp 175 to indicate the "on" condition.

So long as both relays 150 and 151 are both closed the motor 12 connected to the 3-phase lines is being operated with full power applied to bring the motor up to a desired speed.

Note that in the energized condition of relay 150 meter contacts 142—143 of the relay are open and so r.p.m. indicating meter 31 is not in the circuit and that contacts 180, 181 and 182, respectively, shunt controls 190, 191, and 192. Power is applied through closed contacts 170, 171, and 172 when relay 151 is energized.

At this stage in the operation pickup 10 is applied to the appropriate pickup point of rotating member 11 of motor 12 to provide signals which are utilized as described below.

When the signal voltage is developed in pickup device 10 there is one pulse for each revolution of motor 12 applied to input circuit 13, the wave shape is like that shown at 60 in Fig. 1. After the action of diode clamp 14 the positive portions of the waveform have been clipped and the negative input pulses to amplifier 15 appear as shown at 61 in Fig. 1. The pulses are amplified and inverted by amplifier 15. As the pulses are applied to multivibrator 16 they appear as shown at 62 in Fig. 1. For each positive pulse applied to multivibrator 16 a "square-topped" pulse such as shown at 63 in Fig. 1 is developed. The series of square-topped pulses which are applied to biased speed interlock relay control tube 18 charge up its input. The greater the speed, the greater the charge appearing on the grid of tube 18 until sufficient plate current is drawn by tube 18 to energize relay 153. The point at which tube 18 draws sufficient plate current to energize relay 153 is adjustable by control 201. This point corresponds to some predetermined speed of rotation of the motor 12, and accordingly represents some predetermined frequency of the square-topped pulses 63 from multivibrator 16 applied to the input circuit of tube 18. This frequency also represents the lower limit of indication of meter 31, or its nominally zero position.

For purposes of example only the previously used figure of 9000 r.p.m. is set forth as an exemplary lower limit. On such a basis the pulse frequency of pulses 63 would be 150 pulses per second. If the upper limit, or maximum reading for the exemplary range is to be 10,500 r.p.m. then at this value 175 pulses per second is the frequency of pulses 63 shown in Fig. 1.

Upon energization of relay 153, when motor 12 has achieved the speed of 9000 r.p.m. in the example, contacts 200 are opened to release relay 150. Contacts 180, 181 and 182 are opened thus removing the short circuit across each of controls 190, 191 and 192 to permit manual adjustment of the speed of motor 12 with speed control 25 of which 190, 191 and 192 are a part. The manual adjustment is now made to a desired speed within the range 9000–10,500 r.p.m., the speed being indicated on meter 31.

At the same time that pulses 63 are being applied to tube 18 they are also being applied to the grid of integrator tube 17.

Integrator 17 is essentially an amplifier which is capable of adjustment both as to negative grid bias with control 122 and as to plate load and voltage with control 121.

The total resistance between the movable arm 133 of control 121 and the least positive end of resistor 132 and the capacitance of capacitor 126 determine the integration time constant of the circuit. The resultant charge on capacitor 126 is "read" by vacuum tube voltmeter circuit 30. Meter 31 is initially maintained out of the circuit of vacuum tube voltmeter circuit 30 until relay control tube 18 operates. This occurs when the frequency of pulses 63 equals a predetermined value. At this time meter 31 is connected in the circuit from cathode 127 of tube 30 to the return point for the grid of tube 30 at 128. So long as the charge on capacitor 126 remains less than the predetermined value relay tube 18 is not energized and so meter 31 is out of the circuit. Were meter 31 in the circuit its reading would be less than its zero point and may be damaged by the pressure of its indicator arm against the side of the meter case. When relay tube 18 is energized this corresponds to the point at which the current in the meter 31 is zero and all greater values of charge on capacitor 126 corresponding to increased speed of motor 12 and corresponding increase in the frequency of pulses 63 applied to tubes 17 and 18 are then indicated on the scale of meter 31.

Thus it is possible to adjust the operating speed of motor 12 with speed control 25 to any speed within the predetermined indication range of meter 31 to a relatively high degree of accuracy.

For calibrating the tachometer, switch 20 is set up to either maximum or minimum position as required. When switch 20 is set to one of the calibration positions the output signals of oscillator 21 are applied to the input of amplifier 15 through switch contacts 20b. At the same time relay contacts 140, 141 are shorted through switch contacts 20C so as to permit direct application of the output of integrator 17 to the vacuum tube voltmeter 30. At either the maximum or minimum positions of switch 20 the pulse signal applied to amplifier 15 and on through the remainder of the system, as previously described, will trigger relay control tube 18 to finally insert meter 31 into the circuit and so the various controls such as 121 and 122 associated with integrator 17 and 201 associated with relay control tube 18 may be adjusted to bring about the operation of relay control tube 18 at the predetermined minimum frequency corresponding to a predetermined minimum number of revolutions per minute, as desired.

There now remains only to be described the operation of the rate of decay measurement function of the system of this invention.

Thyratron 50 during the normal tachometer function of this invention is maintained in a de-energized condition. Relay 152 is therefore de-energized so that contacts 140, 141 are closed, and contacts 187 are open. The non-conductive or deenergized condition of thyratron 50 is maintained by a negative potential applied to grid 206 of thyratron 50 through resistor 204 and the fact that contacts 159 of relay 154 are open to prevent application of positive potential to the anode of thyratron 50.

When the rate of decay measurement is to be made, the motor 12 is in normal operation at its pre-set speed. This speed is being indicated on meter 31 by the operation of the system of this invention as heretofore described. For example assume this indicated speed to be 9750 r.p.m. Switch 160 is then opened to remove power from relay 154. Contacts 156 switch grid voltage of thyratron 50 from negative to positive through resistors 208 and 209 to charge capacitor 205 in the grid circuit of thyratron 50. Capacitor 205 has an initial negative charge which must be overcome before thyratron 50 can become conductive. Through the contacts 159 of relay 154, now, positive potential from B+ point 185 is applied to the anode of thyratron 50 through the coil of relay 152.

Thus at the moment switch 160 is opened thyratron 50 is de-energized although in condition to be energized as soon as the charge on capacitor 205 becomes positive in value. Also power has been disconnected from motor 12 due to the still open condition of contacts 187 through which power is now applied to relay 151 through the contacts 157 of now open relay 154. Also at the moment of opening switch 160 and the de-energized condition of relay 151 contacts 173 are closed to energize delay indicator lamp 174. Meter 31 continues to function since the system except for application of power to the motor 12 is still operative to indicate revolutions per minute of the motor 12.

Now, at the moment of turning off switch 160 a reading is made of r.p.m. on meter 31, as noted above this may be 9750 r.p.m. The time delay before triggering of thyratron 50 is set by the time it takes capacitor 205 now negatively charged to become positive in charge and is a function of the product of capacitance of 205 with the sum of resistors 208 and 209 in series. For illustrative purposes assume this to be 5 seconds. At the end of the period of 5 seconds the charge on capacitor 205 now is positive. Thyratron 50 is triggered. Relay 152 is energized. Contacts 140—141 are opened and contacts 187 are closed. During this time delay period motor 12 though with no power applied has been free running. Friction and other losses would slow the motor 12 down somewhat in the 5 second delay period. But also during this period meter 31 has been indicating the speed of operation of motor 12. As the motor slows down this indication becomes less by some amount unless the motor is perfectly frictionless. For the illustrative example assume that in the 5 second interval the motor has slowed down to 9250 r.p.m. The meter 31 so indicates at the moment thyratron 50 is energized. The opening of contacts 140—141 at this time removes the output of integrator 17 from charging capacitor 126 at the grid 124 of vacuum tube voltmeter 30. Apart from the normal leakage of capacitor 126 there being no place for it to discharge meter 31 will then hold its indication at 9250 r.p.m. for some appreciable period of time so that the observer may read this value. The loss of 500 r.p.m. in 5 seconds at the initial speed of operation indicates some particular frictional condition which may be referred to charts and formulas available for the purpose of such determination.

When thyratron 50 is triggered, power is again applied to motor 12 through closing of contacts 187.

To prepare for a second decay rate test it is necessary to return the system to normal operation through closing of switch 160.

There has been described above a novel expanded scale electronic tachometer and decay rate indicating system for rotating machines. While a preferred embodiment of the invention has been disclosed and described there may be variations from the details shown and described which may be employed by one skilled in the art to accomplish the novel result of this invention without departing from the intent and spirit of the invention so long as they fall within the ambit of the following claims.

What is claimed as new is:

1. An electronic tachometer comprising an amplifier, said amplifier being responsive to pulses having a repetition frequency corresponding to the speed of a rotating machine; a one-shot multivibrator, said multivibrator being coupled to said amplifier and adapted to be responsive to said pulses to produce a square pulse for each of said pulses applied thereto; an integrator adapted to integrate said square pulses; a relay control circuit, said integrator and said relay control circuit both being coupled to said multivibrator, said relay control circuit having an electromagnetic relay and being responsive to a predetermined frequency of said square pulses to operate said relay; and a vacuum tube voltmeter including indicating means, said vacuum tube voltmeter being coupled to said integrator for developing a current in response to the integration of said square pulses said current increasing as the frequency of said square pulses is increased, and wherein said indicating means is coupled to said relay whereby when said predetermined frequency of said square pulses is reached, said indicating means is connected to said vacuum tube voltmeter for indicating said current corresponding to the rotation speed of the rotating machine.

2. An electronic tachometer comprising a pickup device adapted to be connected to a rotating machine said pickup also being adapted to develop pulses corresponding in frequency to the rotational speed of the machine; an amplifier, said amplifier being coupled to said pickup device for amplifying said pulses; a one-shot multivibrator, said multivibrator being coupled to said amplifier and adapted to be responsive to said pulses to produce a square pulse for each of said pulses applied thereto; an integrator adapted to integrate said square pulses to develop a charge; a relay control circuit, said integrator and said relay control circuit both being coupled to said multivibrator, said relay control circuit being responsive to a predetermined frequency of said square pulses to operate an electromagnetic relay; and a vacuum tube voltmeter having an indicator, said vacuum tube voltmeter being coupled to said integrator for developing a current in response to said charge, said current increasing as the frequency of said square pulses is increased; said indicator being coupled to said relay whereby when said predetermined frequency of said square pulses is reached, said indicator becomes operative together with said vacuum tube voltmeter for indicating said current corresponding to the rotation speed of the rotating machine.

3. An electronic tachometer and decay rate indicator comprising: an amplifier responsive to pulses; a one-shot multivibrator, said multivibrator being coupled to said amplifier and adapted to be responsive to said pulses to produce a square pulse for each of said pulses applied thereto; an integrator; a relay control circuit; an electromagnetic relay; said integrator and said relay control circuit both being coupled to said multivibrator, said relay being connected in said relay control circuit, said relay control circuit being responsive to a predetermined frequency of said square pulses to operate said relay and a vacuum tube voltmeter, said vacuum tube voltmeter being coupled to said integrator for developing a current in response to the integration of said square pulses said current increasing as the frequency of said square pulses is increased, and wherein an indicating means is coupled to said relay whereby when said predetermined frequency of said square pulses is reached, said indicating means is connected to said vacuum tube voltmeter for indicating said current corresponding to the rotation speed of a rotating machine, and wherein said decay rate measuring system includes circuits coupled to said indicating means and said integrator for controlling said integrator to provide indications of the rate of decay of rotation of the machine.

4. An electronic tachometer for accurately measuring speed above a predetermined limit comprising: an integrating capacitor, responsive to pulses whose repetition frequency is proportional to the speed of a device, for developing an average voltage proportional to the repetition rate of the pulses, a first electron discharge device including a grid and a cathode, said capacitor being coupled to the grid and cathode of said first discharge device, an electromagnetic relay including normally open armature switch means, said switch means being coupled to the cathode of said first discharge device, a meter coupled to said switch means, a source of reference potential coupled to said meter, whereby when said switch means closes said meter is coupled between the cathode of said first discharge device and said source of potential, said meter thereby indicating the difference between the voltage developed by said capacitor and the voltage of said source, and a second electron discharge device including a grid, cathode and anode, the grid of said second discharge device being responsive to said pulses, the cathode of said second discharge device being coupled to said source of potential for biasing said second device normally nonconductive, said relay being coupled to the anode of said second discharge device, whereby when the potential at the grid of said second discharge device becomes sufficient to overcome the bias provided by said source of potential, said second discharge device becomes conductive and said relay operates thereby closing said normally open switch means.

5. An electronic tachometer comprising: a source of pulses whose repetition frequency is proportional to the speed of a device, a first capacitor coupled to said source for integrating said pulses to develop a voltage, a voltage amplifier having a high impedance input circuit and an output circuit, said first capacitor being coupled to the input circuit of said voltage amplifier, a first electromagnetic relay having normally open armature switch means, said switch means being coupled to the output circuit of said voltage amplifier, a meter coupled to said switch means, a source of reference potential coupled to said switch means, whereby when said switch means closes said meter is coupled between the output circuit of said voltage amplifier and said source of potential, said meter thereby indicating the difference between the voltage of said first capacitor and the voltage of said source of potential, and a control amplifier having an input circuit and an output circuit, said control amplifier being normally nonconductive, the input circuit of said control amplifier being responsive to said train of pulses, the output circuit of said control amplifier being coupled to said first relay whereby when said train of pulses exceeds a predetermined repetition frequency, said control amplifier becomes conductive thereby causing said normally open switch means to close.

6. The combination of claim 5 which additionally includes an electron discharge device, a second capacitor coupled to the input circuit of said discharge device, said second capacitor normally having a potential which biases said discharge device to cut-off, a second electromagnetic relay having normally closed armature switch means, said second relay being coupled to the output circuit of said discharge device, the switch means of said second relay being connected in series between said first capacitor and said source of pulses, and means for connecting said second capacitor to a source of potential, whereby after a predetermined time interval said discharge device becomes conductive thereby causing said second relay to become operative to open said normally closed contacts causing said meter to indicate persistently the instantaneous speed indication at the end of said time interval.

References Cited in the file of this patent

UNITED STATES PATENTS

| | | |
|---|---|---|
| 2,352,082 | De Rosa | June 20, 1944 |
| 2,602,833 | Swift | July 8, 1952 |
| 2,643,869 | Clark | June 30, 1953 |